(12) United States Patent
Butta' et al.

(10) Patent No.: US 6,633,939 B2
(45) Date of Patent: Oct. 14, 2003

(54) VARIABLE-PRIORITY ARBITRATION METHOD AND RESPECTIVE SYSTEM

(75) Inventors: Pasquale Butta', Messina (IT); Pierre Marty, Seyssins (FR)

(73) Assignee: STMicroelectronics S.r.l., Agrate Brianza (IT)

( * ) Notice: Subject to any disclaimer, the term of this patent is extended or adjusted under 35 U.S.C. 154(b) by 192 days.

(21) Appl. No.: 09/882,358

(22) Filed: Jun. 15, 2001

(65) Prior Publication Data

US 2002/0032819 A1 Mar. 14, 2002

(30) Foreign Application Priority Data

Jun. 16, 2000 (EP) ............................................. 00830424

(51) Int. Cl.$^7$ ............................................. G06F 13/14
(52) U.S. Cl. ........................................ 710/244; 710/116
(58) Field of Search ................................. 710/113, 116, 710/240, 243, 244

(56) References Cited

U.S. PATENT DOCUMENTS 5,381,551 A * 1/1995 Maeda et al. .............. 710/244
5,862,353 A * 1/1999 Revilla et al. .............. 710/240
6,519,666 B1 * 2/2003 Azevedo et al. ............ 710/243

FOREIGN PATENT DOCUMENTS

| EP | 0 552 507 A1 | 7/1993 |
| WO | WO 94/08301 | 4/1994 |

\* cited by examiner

*Primary Examiner*—Glenn A. Auve
(74) *Attorney, Agent, or Firm*—Lisa K. Jorgenson; Robert Iannucci; Seed IP Law Group PLLC

(57) ABSTRACT

A method of arbitration among a plurality of n units which seek access to a resource is regulated according to grants identified by means of an arbitration method, which compares between one another the priorities, generating, for each pair of the units comprising in general a unit x and a unit y with respective priorities Px and Py, a selection signal at a high level if the result of the operation Px>=Py is true. The method generates, for the pairs of the units, respective cross-request signals and generates the grant for the ith unit as a logical product of all the cross-request signals req_i_z with z ranging from 1 to n, excluding the case of z=i.

17 Claims, 2 Drawing Sheets

VARIABLE-PRIORITY ARBITRATION METHOD AND RESPECTIVE SYSTEM

FIELD OF THE INVENTION

The present invention relates to arbitration techniques implemented in the framework of information-processing systems.

BRIEF DESCRIPTION

The increasing complexity in terms of architecture of information-processing systems, and in particular of the so-called "embedded" systems, renders increasingly more important the optimization of the cycles of transfer of data flow from the so-called "initiators" to the so-called "targets" of a system.

In general, the definition of initiator applies to any unit that is able to initiate autonomously a transaction such as to involve the use of a resource (for instance, a dedicated or shared bus) in order to read or write data.

The definition of target applies to any unit starting from which or with which an initiator is able to read or write data.

A system such as an embedded system may have a large number of initiator units, as well as a large number of target units.

At the moment in which two or more initiators simultaneously endeavor to start a transaction aimed at an identical target, it is necessary to solve the conflict by means of an arbitration function. The implementation of such a function may often prove burdensome, in particular in terms of speed of execution.

FIG. 2 of the annexed drawings shows an arbitration procedure carried out according to a solution known in the art within the framework of a generic system (for example, of the embedded type), represented in FIG. 1, a figure which in itself applies both to the prior art and to the invention.

At the start of the respective transaction, each initiator I1, I2, I3, etc., presents a priority to the so-called system arbiter A, which solves the conflict by enabling start of the transactions by the initiators having the highest priority and proceeding progressively down to the ones with the lowest priority. Data transactions towards any target T are thus regulated by the arbiter A, which solves the possible conflicts by means of the priority information supplied by the initiators themselves. A transaction consists in the transfer of a data packet from the initiator involved to the target T or vice versa.

At the start of transaction, each initiator I1, I2, I3, etc., asserts a request signal to the arbiter A. The arbiter signals that the transaction has been accepted by means of a grant signal asserted to the initiator with the highest priority among the ones that wish to start the transaction simultaneously. Then it signals, in the subsequent cycles, acceptance of the transactions to the initiators having lower priorities when the transactions having higher priorities have been completed.

This procedure is shown schematically in FIG. 2 with reference to a system comprising three initiators I1, I2, I3 and a target T. The arbiter A, which operates according to the clock signal represented in the diagram at the top of FIG. 2, solves any conflicts on the basis of the priorities received with the timings shown in the FIG. All this is done by applying basically a mechanism of comparison of inequalities in sequential order, as represented in FIG. 2. Here, it is assumed that initiator I1 has a higher priority than initiator I2, which in turn has a higher priority than initiator I3, so that grants are granted in order first to initiator I1, then to initiator I2, and finally to initiator I3.

Albeit functional, the mechanism described above presents intrinsic limits related to the speed of execution of the arbitration algorithm, to the sensitivity of the speed of execution of arbitration according to the coding of the priority (typically on a generic number n of bits), and to a marked increase in the execution delay as the number of initiators increases.

SUMMARY OF THE INVENTION

An embodiment of the present invention provides a solution that is able to overcome the drawbacks referred to above.

The arbitration procedure according to an embodiment of the invention is basically a variable-priority arbitration mechanism that can be used advantageously in high-speed applications, such as in decoders for high-definition television signals. The corresponding interconnection subsystem, comprising three initiators or requesters (LMI, up-Interface, and GPx Interface units) and a target T (the SDRAM memory interface), is able to operate with a clock signal, for example, at 100 MHz. The solution makes it possible to differentiate processes having different priorities, which can access the external SDRAM through the same initiator.

In general, the solution may, however, be used in N×M systems (i.e., with N initiators and M targets) by introducing an arbiter for each destination. The time of execution of the procedure increases only as a result of the decoding of the destination address; hence—referring to current technologies (such as 0.25-micron technology)—with values of a few tenths of nanoseconds for each destination.

BRIEF DESCRIPTION OF THE DRAWINGS

The invention will now be described, purely to provide a non-limiting example, with reference to the attached drawings in which.

DETAILED DESCRIPTION OF THE INVENTION

Figure 1:
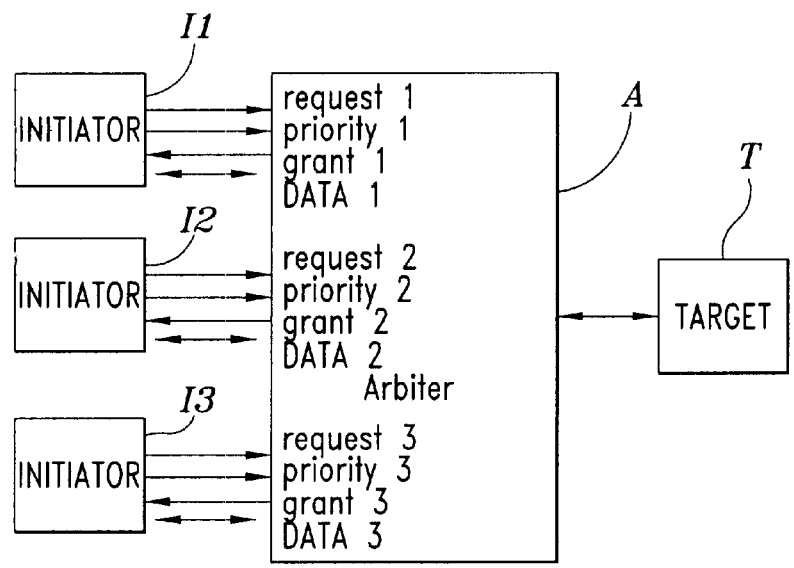
FIGS. 1 and 2, the latter referring specifically to the prior art, have already been described previously.
Figure 2:
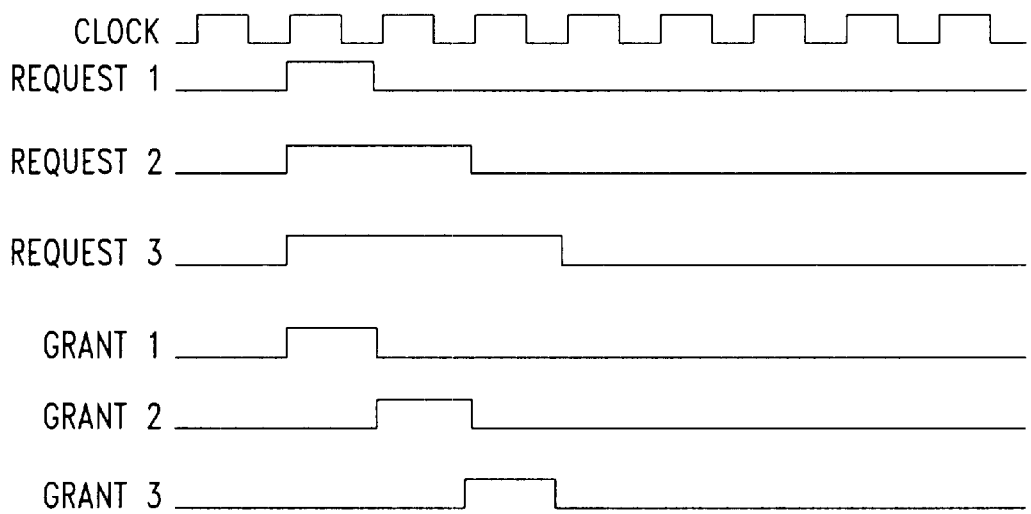

An embodiment according to the invention is designed to operate in a situation which—as regards the aspects of a general nature—corresponds to the solution represented in FIG. 1.

Figure 3:
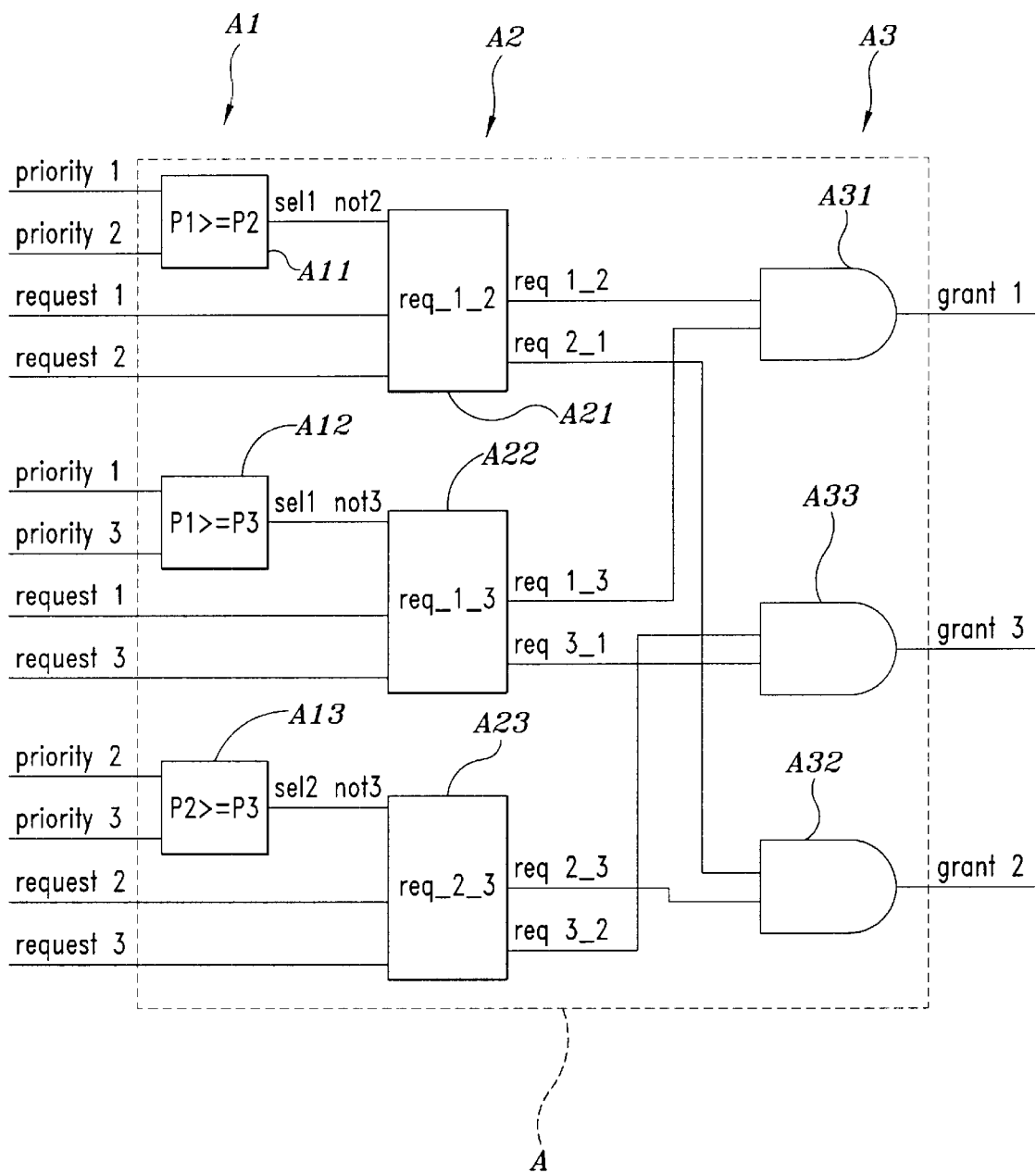
FIG. 3 illustrates, in the form of a block diagram, the possible architecture of an arbitration system operating according to the invention.

Specifically, the block diagram of FIG. 3 represents the architecture of the arbiter A which can be adopted for implementing an embedded system in which three initiators I1, I2 and I3 designed to access a single target T are present.

In practice, the architecture of the arbiter represented in FIG. 3 comprises three stages, designated by A1, A2, and A3, and designed to perform in a staggered arrangement three successive steps of the arbitration procedure.

The above-mentioned steps (and consequently the corresponding stages A1, A2, and A3) may be generally identified as:

comparison of priorities (stage A1);

cross generation of requests (stage A2); and cross generation of grants (stage A3).

Each of the stages A1, A2, and A3 in turn comprises three modules or blocks that are substantially identical to each other.

The three blocks of stage A1, designated by A11, A12, and A13, receive as their inputs the priority signals or data corresponding to a respective pair of initiators; these are (in the embodiment illustrated), in order, the pair I1, I2, the pair I1, I3, and the pair I2, I3.

The respective output signals are sent, in order, to the modules of stage A2, designated A21, A22, and A23. The latter receive, respectively and in order, also the request signals generated by the initiators of the pair I1, I2, of the pair I1, I3, and of the pair I2, I3.

Each of the modules A21, A22, and A23 generates as its output two cross-type request signals designed to be sent on to the three modules of stage A3, designated in order by A31, A32, and A33.

In particular, of the two outputs of the module A21, one is sent to the module A31 and the other to the module A32. Of the two outputs of the module A22, one is sent to the module A31 and the other to the module A33. Finally, of the two outputs of the module A23, one is sent to the module A32 and the other to the module A33.

The output signals of the modules A31, A32, and A33 constitute the grant signals that represent the result of the arbitration procedure and are designed to be assigned, respectively, to the initiator I1, to the initiator I2, and to the initiator I3.

In the sequel of the present description, the arbitration procedure according to the invention will, however, be illustrated referring, in general terms, to the generic presence of N initiators or requestors.

Stage No. 1: Comparison

Assuming that there are N requesters, and that associated to the ith requestor is the priority Pi (for example, P1 is the priority of the requestor 1), the following operations are performed in parallel:

P1>=P2 (generates the signal sel1not2, high if the result of the operation is true)

p1>=P3 (generates the signal sel1not3)

P1>=Pn (generates the signal sel1notn)

P2>=P3 (generates the signal sel2not3)

P2>=P4 (generates the signal sel2not4)

P2>=P3 (generates the signal sel2notn)

Pn−1>=Pn (generates the signal sel1n−1notn)

Hence, in general terms, for each pair of requestors, identified in general as x and y, the stage A1 generates the signal selxnoty at a high level if it is true that Px>=Py.

For Example 1. with 2 requesters: P1>=P2 (1 comparator)
2. with 3 requesters: P1>=P2, P1>=P3, P2>=P3 (3 comparators)
3. with 4 requestors: P1>=P2, P1>=P3, P1>=P4, P2>=P3, P2>=P4, P3>=P4 (6 comparators)
4. with 6 requestors: P1>=P2, P1>=P3, P1>=P4, P1>=P5, P1>=P6, P2>=P3, P2>=P4, P2>=P5, P2>=P6, P3>=P4, P3>=P5, P3>=P6, P4>=P5, P4>=P6, P5>=P6 (total 15 comparators)
5. with n requesters: (total=1+2+3+4+ . . . n−2+n−1, which, setting y=n−1 means total=(y/2*(y+1)) comparators In a preferred way, all the comparisons are performed simultaneously, and their complexity depends on the priority range. For example, in a high-definition TV decoder the priority range may be between 0 and 15.

Stage No. 2: Cross Generation of Requests

This stage uses the requests coming from the initiators and the results coming from the comparators of the stage upstream so as to calculate intermediate parameters that are useful for the generation of the grants.

In particular, the following function is implemented: req_arb (selxnoty, req_x, req_y, req_x_y, req_y_x), where req_x (respectively req_y) is the request coming from the initiator x (respectively y), whilst req_x_y and req_y_x are, respectively, the outputs of the functions:

req_x_y=req_x AND (selxnoty OR NOT req_y), and req_y_x=req_y AND (NOT selxnoty) OR (NOT req_x)).

In practice, req_arb corresponds to a three-input and two-output module:

req_arb (INPUTS: selxnoty, reqx, reqy

OUTPUTS: reqx_y, reqy_x)

This performs an arbitration function between the pairs of requests reqx, reqy (in the example illustrated in FIG. 3: req1, req2, or req1, req3, or again req2, req3), the result having a coding of the one-hot type, i.e., of the type in which there are n results representable using n binary figures; in the present case 01 or 10.

The result of such an operation depends on the following factors:

i) priority of reqx with respect to reqy: reqx having a higher priority than reqy when selxnoty is at a high logic level, and vice versa, when it is at a low logic level;

ii) presence of the requests: the decision is affected by the actual presence of requests; in fact, even in the situation in which selxnoty is at a high logic level, reqy could be served (this being only an intermediate result) in the absence of reqx.

Consequently:

the output reqx_y will be at a high logic level (certainly reqx is to be privileged with respect to reqy) when the signal reqx is at a high logic level (presence of the request) and, at the same time, when reqx has the higher priority with respect to reqy (selxnoty at a high logic level) or when reqy is at a low logic level (absence of request);

the output reqy_x will be at a high logic level (certainly reqy is to be privileged with respect to reqx) when the signal reqy is at a high logic level (presence of the request) and, at the same time, when reqy has the higher priority with respect to reqx (selxnoty at a low logic level) or when reqx is at a low logic level (absence of request).

In all, y/2*(y+1) req_arb modules will be required.

Stage No. 3: Cross Generation of Grants

Once the requests have been re-ordered, the final operation consists in the generation of the grants.

For each ith requestor, the grant_i is simply obtained by operating the logical AND among all the signals req_I_z, with z ranging from 1 to N, excluding the case of z=i.

Examples a) 3 requestors

Stage 1:

Calculation in parallel of

P1>=P2, P1>=P3, P2>=P3

Stage 2:

Calculation in parallel of req_arb(P1>=P2, req1, req2, req1_2, req2_1)

req_arb(P1>=P3, req1, req3, req1_3, req3_1)

req_arb(P2>=P3, req2, req3, req2_3, req3_2)

Stage 3:
grant1=req1_2 AND req1_3
grant2=req2_1 AND req2_3
grant3=req3_1 AND req3_2
b) 4 requestors
Stage 1:
Calculation in parallel of
P1>=P2, P1>=P3, P1>=P4, P2>=P3, P2>=P4, P3>=P4
Stage 2:
Calculation in parallel of
req_arb(P1>=P2, req1, req2, req1_2, req2_1)
req_arb(P1>=P3, req1, req3, req1_3, req3_1)
req_arb(P1>=P4, req1, req4, req1_4, req4_1)
req_arb(P2>=P3, req2, req3, req2_3, req3_2)
req_arb(P2>=P4, req2, req4, req2_4, req4_2) req_arb (P3>=P4, req3, req4, req3_4, req4_3)
Stage 3:
grant1=req1_2 AND req1_3 AND req1_4
grant2=req2_1 AND req2_3 AND req2_4
grant3=req3_1 AND req3_2 AND req3_4
grant4=req4_1 AND req4_2 AND req4_3

In brief, the described embodiment of the invention enables a faster execution of the variable-priority arbitration algorithm. All this in a situation in which the time of execution is not very sensitive to coding of priority. In addition, the time of execution of the arbitration is not strongly influenced by the number of initiators. The implementation is of a modular type, whereby the elements that distinguish it (see diagram of FIG. 3) can be replicated to implement arbiters with a generic number n of choices.

For example, experiments conducted by the present applicant have shown that, in the case of an embedded system with 9 initiators in 0.25-micron technology, the time of generation of the grants with respect to the requests is 3 nanoseconds.

Of course, without prejudice to the principle of the invention, the details of construction and the embodiments may vary widely with respect to what is described and illustrated herein, without thereby departing from the scope of the present invention as defined in the annexed claims.

We claim:

1. A method of arbitration between a plurality of n units seeking access to a resource by expressing respective requests and respective priorities, access of said units to said resource being regulated according to grants identified by means of the arbitration method, the arbitration method comprising:

comparing between one another said respective priorities, generating, for each pair of said units comprising in general a unit x and a unit y with respective priorities Px and Py, a selection signal at a high level if the result of the operation Px>=Py is true;

generating, for said pairs of said units, respective cross-request signals $$req\_arb(selxnoty, req\_x, req\_y, req\_x\_y, req\_y\_x)$$

where
selxnoty is the aforesaid selection signal;
req_x is the request coming from the unit x;
req_y is the signal coming from the unit y; and
req_x_y and req_y_x are, respectively, the outputs of the function
req_x AND (selxnoty OR NOT req_y)
and of the function
req_y AND ((NOT selxnoty) OR (NOT req_x)); and generating the grant for an ith unit as a logical product of all the aforesaid cross-request signals req_i_z with z ranging from 1 to n, excluding the case of z=i.

2. A method according to claim 1, said comparing between said respective priorities is performed in parallel for all said pairs of said units.

3. A method according to claim 1 wherein said cross-request signals are generated in parallel for all said pairs of said units.

4. An arbiter for a system that includes a plurality of n units structured to seek access to at least one resource by expressing respective requests and respective priorities, access of said units to said resource being regulated according to grants generated by said arbiter, said arbiting comprising:

a comparison stage for comparing between one another said respective priorities, generating, for each pair of said units comprising in general a unit x and a unit y with respective priorities Px and Py, a selection signal at a high level if the result of the operation Px>=Py is true;

a cross-request generation stage for generating, for said pairs of said units, respective cross-request signals $$req\_arb(selxnoty, req\_x, req\_y, req\_x\_y, req\_y\_x)$$

where
selxnoty is the aforesaid selection signal;
req_x is the request coming from the unit x;
req_y is the signal coming from the unit y; and
req_x_y and req_y_x are, respectively, the outputs of the function
req_x AND (selxnoty OR NOT req_y)
and of the function
req_y AND ((NOT selxnoty) OR (NOT req_x)); and a grant-generation stage for generating the grant for an ith unit as a logical product of all the aforesaid cross-request signals req_i_z with z ranging from 1 to n, excluding the case of z=i.

5. A system according to claim 4 wherein said comparison stage is configured for conducting said operation of comparison between said respective priorities in parallel for all said pairs of said units.

6. A system according to claim 4 wherein said cross-request generation stage is configured for generating said cross-request signals in parallel for all said pairs of said units.

7. A system according to claim 4 wherein said resource consists of a bus.

8. A system according to claim 4 wherein the units of said plurality are configured to perform, as a transaction towards said resource, a data exchange with the resource itself.

9. A system according to claim 4 wherein said system is an embedded-type system.

10. An arbitration method, comprising:

receiving first, second, and third arbitration requests for access to a target resource, the first, second, and third arbitration requests being associated with first, second, and third priorities, respectively;

generating a first selection signal having a value that depends on a comparison of the first and second priorities;

generating a second selection signal having a value that depends on a comparison of the first and third priorities;

generating a first cross-request signal having a value indicative of the logical AND of the first arbitration request with the logical OR of the first selection signal and the logical NOT of the second arbitration request;

generating a second cross-request signal having a value indicative of the logical AND of the first arbitration request with the logical OR of the second selection signal and the logical NOT of the third arbitration request; and generating a first grant signal having a value indicative of the logical AND of the first and second cross-request signals.

11. The method of claim 10 wherein the steps of generating the first and second selection signals are performed in parallel.

12. The method of claim 10 wherein the first, second, and third arbitration requests are received from first, second, and third requesters, respectively.

13. The method of claim 10 wherein the steps of generating the first and second cross-request signals are performed in parallel.

14. The method of claim 10, further comprising:

generating a third selection signal having a value that depends on a comparison of the second and third priorities;

generating a third cross-request signal having a value indicative of the logical AND of the second arbitration request with the logical OR of the logical not of the first selection signal and the logical NOT of the first arbitration request;

generating a fourth cross-request signal having a value indicative of the logical AND of the second arbitration request with the logical OR of the third selection signal and the logical NOT of the third arbitration request; and generating a second grant signal having a value indicative of the logical AND of the third and fourth cross-request signals.

15. The method of claim 14, further comprising:

generating a fifth cross-request signal having a value indicative of the logical AND of the third arbitration request with the logical OR of the logical not of the second selection signal and the logical NOT of the first arbitration request;

generating a sixth cross-request signal having a value indicative of the logical AND of the third arbitration request with the logical OR of the logical NOT of the third selection signal and the logical NOT of the second arbitration request; and generating a third grant signal having a value indicative of the logical AND of the fifth and sixth cross-request signals.

16. The method of claim 10, further comprising:

generating a third selection signal having a value that depends on a comparison of the second and third priorities;

generating a third cross-request signal having a value indicative of the logical AND of the third arbitration request with the logical OR of the logical not of the second selection signal and the logical NOT of the first arbitration request;

generating a fourth cross-request signal having a value indicative of the logical AND of the third arbitration request with the logical OR of the logical NOT of the third selection signal and the logical NOT of the second arbitration request; and generating a second grant signal having a value indicative of the logical AND of the third and fourth cross-request signals.

17. The method of claim 10 wherein the first selection signal is at a high level if the first priority is greater than or equal to the second priority.

* * * * *